United States Patent
Berghofer

[11] 3,826,464
[45] July 30, 1974

[54] DISENGAGEABLE SAFETY COUPLING FOR CONDUITS

[76] Inventor: Hans Berghofer, Alte Landstrasse 274, 2 Hamburg 65, Germany

[22] Filed: Apr. 9, 1973

[21] Appl. No.: 348,784

[52] U.S. Cl. .............................................. 251/149.9
[51] Int. Cl. ............................................... F16k 5/04
[58] Field of Search ............ 251/149.1, 149, 149.2, 251/149.5, 149.8, 149.9; 137/614.06

[56] References Cited
UNITED STATES PATENTS

| 3,087,703 | 4/1963 | Windel | 251/149.9 |
| 3,100,619 | 8/1963 | Berghofer et al. | 251/149.9 |
| 3,477,689 | 11/1969 | Berghofer | 251/149.9 |

*Primary Examiner*—William R. Cline
*Attorney, Agent, or Firm*—Michael S. Striker

[57] ABSTRACT

A first coupling member has a first and a second port communicating with its interior, and a valve body is accommodated in the first coupling member and has a passage. The valve body is turnable relative to the first coupling member between a position permitting fluid flow between the ports, a position preventing fluid flow, and a coupling position. A second coupling member is insertable into and withdrawable from the passage of the valve body so as to be coupled and turnable with the latter but only when the valve body is in its coupling position. The valve body is provided with a collar coaxial with its turning axis and extending in sealing relationship through an opening of the first coupling member. This collar is provided with one or more circumferential first slots whose length corresponds to the angular distance between the fluid-flow blocking position and the coupling position and which has an axially recessed end portion. A second collar is provided on the first coupling member, surrounding the opening therein as well as the first collar, and having at the level of the first end portion a circumferentially extending second slot whose length corresponds to the angular distance between the fluid-flow permitting and fluid-flow blocking positions and which has an axially recessed second end portion extending to the level of the first slot. A control member is provided for effecting manual turning of the valve body between its positions. The control member is coaxial with the second collar and has at least one connecting member turnable with the control member and having portions extending into the slots. These portions are received in the first end portion when the valve member is located intermediate its fluid-flow permitting and fluid-flow blocking positions, and in the second end portion when the valve member is intermediate its fluid-flow blocking and coupling positions.

10 Claims, 6 Drawing Figures

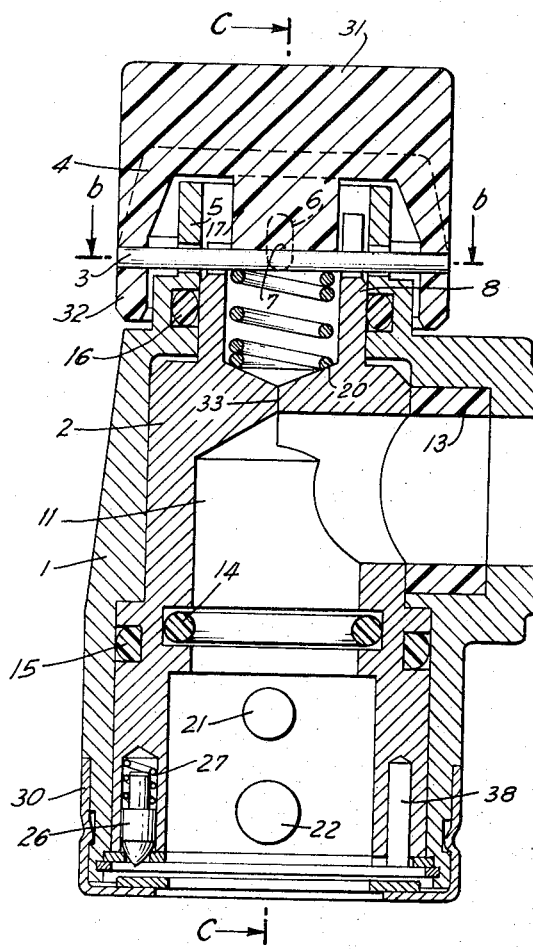
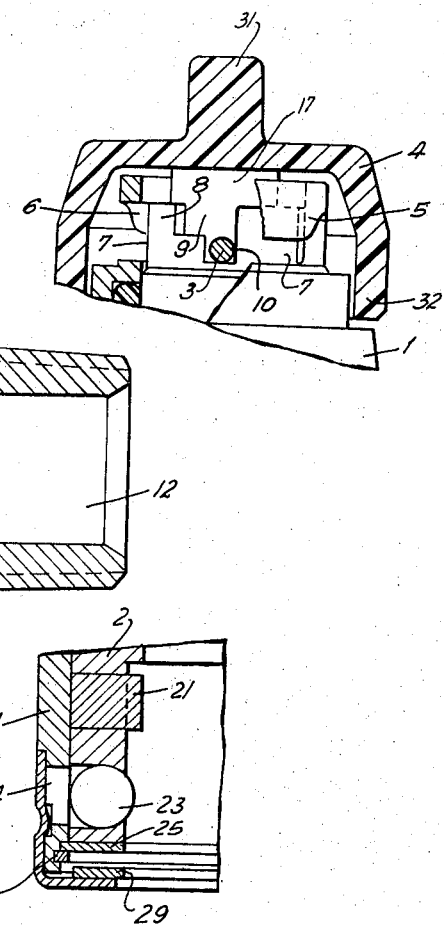
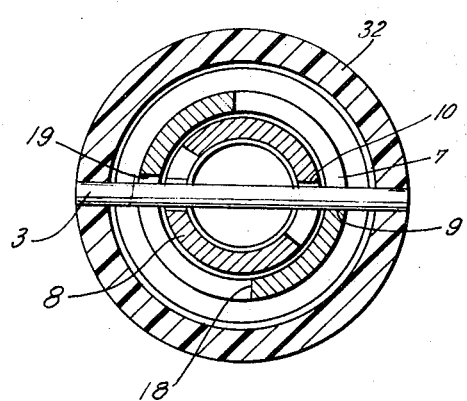

3,826,464

DISENGAGEABLE SAFETY COUPLING FOR CONDUITS

BACKGROUND OF THE INVENTION

The present invention relates generally to a coupling for conduits, and more particularly to a disengageable safety coupling for conduits.

Safety couplings for conduits are already known wherein one coupling member can be disengaged from the other coupling member only when a valve member associated with the coupling is in a fluid-flow blocking position. The purpose is to prevent undesired escape of fluid, such as water, gas or the like, when the coupling is separated. Such a construction is for instance known from German patent No. 1,136,294 and has been found in practice to be highly advantageous.

However, certain improvements over the construction in the aforementioned German patent are desirable for two reasons, namely on the one hand because it is not readily and at a casual glance ascertainable from the known safety coupling in what position the associated valve member is located, that is whether it is in fluid-flow permitting position, in fluid-flow blocking position, or in coupling and uncoupling position. In addition, the aforementioned construction of the German patent —as well as all others of type bype which are known to me— do not preclude the obviously undesirable possibility that as the valve member is moved from fluid-flow permitting to fluid-flow blocking position it might be actually moved beyond this latter position to the coupling and uncoupling position. In many instances, however, the disengageable portion of the coupling is inserted from below into the other portion of the coupling so that, when the valve member is inadvertently turned past fluid-flow blocking position to the coupling and uncoupling position, the weight of the disengageable portion of the coupling may pull this disengageable portion out of the other portion and thus cause an undesirable disengagement of the coupling.

SUMMARY OF THE INVENTION

It is, accordingly, an object of the present invention to provide an improved disengageable safety coupling for conduits which avoids the aforementioned disadvantages.

More particularly, it is an object of the present invention to provide such an improved disengageable safety coupling in which the particular position of the associated valve body can be readily visually ascertained even at a casual glance.

A further object of the invention is to provide such a disengageable safety coupling in which there is a functional separation afforded between the fluid-flow permitting and fluid-flow blocking operations on the one hand, and the coupling and uncoupling operation on the other hand.

In keeping with these objects, and others which will become apparent hereafter, one feature of the invention resides in a disengageable safety coupling for conduits which, in a currently preferred embodiment, comprises a first coupling member provided with an interior space having a first and a second port, and a valve body accommodated in this coupling member and having a passage. The valve body is turnable relative to the first coupling member between a first position permitting fluid flow between the ports, a second position preventing the flow of fluid between the ports, and a third position. A second coupling member is insertable into the withdrawable from the passage in coupling relationship with the valve body, only when the latter is in its third position. A first collar is provided on the valve body coaxial with the turning axis thereof and extends in sealing relationship through an opening of the first coupling member. This first collar has at least one circumferential first slot whose length corresponds to the angular distance between the second and third positions and which has an axially recessed first end portion. A second collar is provided on the first coupling member surrounding the opening therein and the first collar; it has at the level of the first end portion a circumferentially extending second slot whose length corresponds to the angular distance between the first and second positions and which has an axially recessed second end portion extending to the level of the first slot. A control member is provided for effecting manual turning of the valve body between the positions thereof and it is arranged coaxially with the second collar. The control member comprises at least one connecting member turnable with the control member having portions extending into the slots, which portions are received in the first end portion when the valve member is intermediate its first and second positions, and in the second end portion when the valve member is intermediate its second and third positions.

It is advantageous and currently preferred if the control member is provided on an exterior and therefore visible surface portion with a marking indicative of the position in which the valve body is located at any given time. Such marking may be in form of an elongated rib extending transversely to the turning axis of the valve body and control member and capable of serving for engagement by the fingers of a user. The connecting member may advantageously be configured as a transversely extending connecting pin and can be mounted in a projection of the control member which extends into the first collar, in apertures provided in a skirt formed on the control member and exteriorly surrounding the projection as well as the first collar, or in both the skirt and the projection. Because the angular turning movement required between the first and second position normally corresponds to approximately 90°, the two collars may each be provided with two diametrally opposite slots, and the axially recessed end portions, with the slots being provided with axially recessed end portions, and with these recesses being located at identical ends in the two slots of each collar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an axial section through a safety coupling according to the present invention, with the valve member thereof being located in fluid-flow permitting position;

FIG. 2 is a fragmentary axial section through a portion of FIG. 1, taken on line c—c thereof;

FIG. 3 is a fragmentary section through another portion of FIG. 1, also taken on line c—c thereof;

FIG. 4 is a section taken on line b—b of FIG. 1;

DESCRIPTION OF THE PREFERRED EMBODIMENTS

Figure 5:
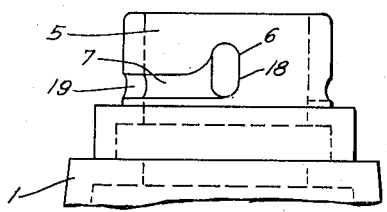
FIG. 5 is a diagrammatic fragmentary elevation showing a detail of one of the collars in the embodiment of FIG. 1.
Figure 6:
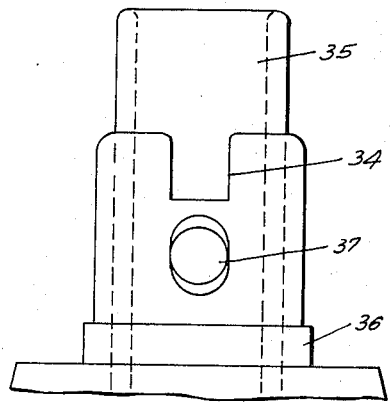
FIG. 6 is a diagrammatic fragmentary elevation showing a detail of one of the coupling members in the embodiment in FIG. 1.

Discussing the embodiment in FIGS. 1–6, which of course should be understood to be clearly exemplary, it will be seen that the first coupling portion or member of the illustrated embodiment is identified with reference numeral 1 and constitutes a housing having two ports which in the illustrated embodiment are offset through 90° and one of which is identified with reference numeral 12. Mounted in the housing 1 for turning movement therein is a valve body 2 having an internal passage 11 into which there extend coupling projections 21. A second coupling member or element is identified with reference numeral 35 (see FIG. 6) and is to be inserted into the passage 11 at that port which is not identified with a reference numeral.

The valve body 2 is sealed with reference to the housing 1 via sealing rings 15 and 16 and a sealing member 13. It has a transverse wall 2 provided with a collar 8 which is coaxial to the turning axis of the valve body and extends through an opening in the housing 1 to the exterior thereof. The collar 8 is surrounded by a collar 5 provided at the exterior of the housing 1. The collar 5 has two guide slots 7 located diametrally opposite one another relative to the turning axis of the body 2 and each extending over approximately 90° of the circumference of the collar 5. Each of the slots 5 is provided at one end with an axially extending recessed end portion 6 as shown in FIG. 5. The collar 8 is provided with similar slots 9, which act as coupling slots and are also diametrally opposite one another. The slots 9 extend in circumferential direction of the collar 8 over approximately 30° and in the illustrated embodiment they are produced for manufacturing reasons as recesses formed in the axial end face of the collar 8. Each of the slots 9 is provided at one end with an axially recessed stepped end portion 10 extending to the level of the slots 7.

A control member or knob 4 is provided which is located exteriorly of the housing 1 coaxial with the collar 8. It has a central projection 17 that is surrounded radially outwardly thereof by a skirt 32 which is located outwardly of the collar 5. A free end face of the knob 4 is provided with a marker for indicating the position in which the valve body 2, with which the knob 4 turns, is located. In the illustrated embodiment this marker is in form of a raised rib 31 extending transversely to the turning axis of the knob 4 and also able to serve for engagement by the fingers of a user in order to turn the knob 4. The free end of the projection 17 is provided with a transversely extending groove, and a transverse extending connecting member or pin 3 is lodged in this groove and has end portions extending into openings provided for this purpose in the skirt 32 (see FIG. 1). Portions of the pin 3 extend through the slots 7 and 9, and when the valve body 2 is in the fluid-flow permitting position shown in FIGS. 1, 2 and 4 they are received in the end portion 10.

A helical expansion spring 20 is provided within the collar 8, extending axially therein and bearing with its opposite ends against the projection 17 (and thereby the pin 3) and the transverse wall 33 of the valve body 2. It thus tends to displace the pin 3 and the knob 4 outwardly of the opening through which the collar 8 extends. When the valve body 2 is turned via the knob 4 or the coupled member 35 from the illustrated open position to the closing position (the fluid-flow blocking position), the pin 3 sliding in the slots 7 will be urged into the recesses 6 when the closing position is reached, due to the pressure exerted by the spring 20. This permits the knob 4 to be pushed further outwardly by an extent corresponding to the axial length of the end portions 6. If subsequently the valve body 2 is turned further from the closed position into the coupling position, by means of the coupling member 35, then the knob 4 will not any longer participate in this movement because the pin 3 has been lifted out of the end portion 10 by the spring 20 and during such further turning of the valve body 2 from closed to coupling and uncoupling position the pin 3 can therefore slide in the slots 9 without taking along the knob 4. The latter, incidentally, can readily be removed by merely withdrawing the pin 3 through one of the openings in the skirt 32.

The valve body 2 is provided with bores 22 in which coupling balls 23 are located which project into the passage 11, as shown in FIG. 3. The housing 1 is provided with recesses 24 at the points where the coupling members 23 will be located when the valve body reaches its respective positions. The member 35 is provided with axial recesses 34 for the projections 21 and with radial recesses 37 for the coupling members 23. When the member 35 is inserted into the passage 11 the members 23 are pushed back into the bores 24, and the projections 21 enter into the recesses 34 so that the member 35 is coupled with the valve body 2 for joint turning movement. A sealing ring 14 provided in the interior of the passage 11 engages the member 35 when the latter is so inserted, to provide a seal therewith. If the valve member 2 is now turned by turning of the member 35, the coupling members 23 are pushed out of the bores 24 and enter into the recesses 37 of the member 35, so that in all positions of the valve body other than the coupling and uncoupling positions thereof, a withdrawal of the member 35 from the passage 11 is reliably prevented.

According to the invention it is desired that a movement of the valve body 2 to fluid-flow permitting position be precluded when the member 35 is uncoupled from the member 1. To assure that this cannot take place there is provided a pin 26 which is located in a blind bore formed in the valve member 2 (see FIG. 1) and this pin is urged outwardly by a helical spring 27. It is pressed against a washer 25 which is retained in the housing 1 by means of a circlip 28 (see FIG. 3) and extends into a hole provided for this purpose in the washer 25 when the valve member 2 is in fluid-flow blocking position. Axially outwardly of the washer 25 there is provided an unblocking washer 29 which is held on the housing by means of a cap 30. An unblocking shoulder 36 is provided on the member 35 and when the latter is inserted into the passage 11, this shoulder 36 engages the washer 29 and pushes the same against the projecting tip of the pin 26, displacing the latter inwardly against the action of the spring 27. This inward displacement is sufficient for the tip to be so depressed in the hole of the washer 25, that when a force is exerted on the valve body 2 in a sense attempting to turn the latter, the rounded tip of the pin 26 will snap out of the hole in the washer 25. Conversely, when the valve body 2 is turned with the member 35 coupled with it, that is when it is turned to the coupling and uncoupling position and the member 35 is then withdrawn from the passage 11, the pin 26 will snap into the hole provided in the washer 25 and will block the valve body against any turning movement from the coupling and uncoupling position to the fluid-flow blocking or fluid-flow permitting positions.

The angular displacement of the valve member 2 is delimited by provision of an abutment projection 38 which is displaceable in a circumferentially extending cutout of the washer 25 against opposite end portions of which cutout it can abut depending upon the turning movement. Turning of the knob 4 is delimited by abutments 18 and 19 provided at the ends of the respective slots 7.

It will be appreciated that with the construction according to the present invention the movement of the valve body 2 between fluid-flow permitting and fluid-flow blocking positions can be carried out by turning the knob 4, once the member 35 has been inserted into and coupled with the valve body 2. It is therefore only necessary to use the member 35 for the uncoupling movement, and of course its undesired coupling is reliably prevented. The rib 31 or other expedient provided in its place indicates very clearly and very readily the particular position in which the valve body is at any given time.

By comparison to the constructions known from the prior art the construction according to the present invention thus functionally separates the fluid-flow permitting and fluid-flow blocking movements of the valve body 2 from the coupling operation between the members 1 and 35. Of course, the movement of the valve body 2 can be carried out —as in the prior art— by turning the member 35 if desired, but it will be principally carried out by turning the knob 4. Because of the abutments delimiting the slots 7, 9 the knob 4 cannot be turned unintentionally beyond the closing position to the coupling and uncoupling position, as in the prior art.

It is evident that the illustrated embodiment is exemplary only and that those conversant with this art can readily make changes to adapt it to a particular requirement. For instance, the knob 4 can be changed in its configuration, the slots 7, 9 and the associated pin 3 can be changed, and the latter can for instance be replaced by two or more individual pins rather than a single transverse pin. The pin 3 also need not necessarily be provided in the projection 17 but could be mounted only in the openings of the skirt. If individual pins should be used rather than a single transversely extending pin, these could be mounted on the projection 17 or on the skirt, and each extend into one of the guide slots and one of the coupling slots. What is important is that the coupling slot is axially displaced relative to the guide slot and that the pin 3 or its substitutes be able to move from the coupling slot into the guide slot and vice versa only when the valve body 2 is in the fluid-flow blocking position.

It will be understood that each of the elements described above, or two or more together, may also find a useful application in other types of constructions differing from the types described above.

While the invention has been illustrated and described as embodied in a disengageable safety coupling for conduits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. Disengageable safety coupling for conduits, comprising a first coupling member provided with an interior space having a first and a second port; a valve body accommodated in said first coupling member and having a flowpath-defining passage, said valve body being turnable relative to said first coupling member between a first position in which said passage communicates with and permits fluid flow between said ports, a second position in which said passage is out of communication with said ports and fluid flow between the same is prevented, and a third position; a second coupling member insertable into and withdrawable from one end of said passage only when said valve body is in said third position; coupling means for releasably coupling said second coupling member to said valve body when said second coupling member is inserted into said one end of said passage; a first collar provided on said valve body coaxial with the turning axis thereof and extending in sealing relationship through an opening of said first coupling member, said first collar having at least one circumferential first slot whose length corresponds to the angular distance between said second and third positions and which has an axially recessed first end portion; a second collar on said first coupling member surrounding said opening and said first collar and having at the level of said first end portion a circumferentially extending second slot whose length corresponds to the angular distance between said first and second positions and which has an axially recessed second end portion extending to the level of said first slot; and a control member for effecting manual turning of said valve body between said first and second positions thereof, said control member being arranged coaxially with said second collar and comprising at least one connecting member turnable with said control member and having portions extending into said slots and adapted to be received in said first end portion in all positions of said valve body between said first and second positions, and to be received in said second end portion in all positions of said valve body between said second and third positions.

2. A coupling as defined in claim 1; and further comprising biasing means engaging said control member and connecting member and urging both thereof axially of said collars and in direction outwardly away from said opening.

3. A coupling as defined in claim 1, said control member having an outer exposed surface provided with an elongated portion extending transversely of the turning axis of said control member for affording a visual indication of the respective position of said valve body.

4. A coupling as defined in claim 1, said control member having a projection extending into the confines of said collars, and an annular skirt surrounding said projection radially outwardly thereof and being located radially outwardly of said second collar; and wherein said connecting member is a connecting pin extending transversely of the turning axis of said control member and valve body, and being mounted on at least one of said projection and skirt.

5. A coupling as defined in claim 1, wherein said collars are each provided with an additional one of said first and second slots, respectively, the slots of each collar being located diametrally opposite one another and the respective axially recessed end portions being located at the same ends of the slots in each collar.

6. A coupling as defined in claim 1, wherein said first slot is a cutout recessed in a free axial endface of said first collar.

7. A coupling as defined in claim 1, wherein said control member is a control knob.

8. A coupling as defined in claim 1, said control member comprising a projection extending into said first collar, and said valve body having a transverse wall portion extending across said first collar inwardly of an open end thereof through which said projection extends; and further comprising a helical expansion spring received in said first collar and bearing with its opposite ends on said wall and said projection, respectively.

9. A coupling as defined in claim 1, wherein said second slot and second end portion merge with one another via an arcuately curved intermediate portion.

10. A coupling as defined in claim 1; further comprising blocking means for blocking said valve body against rotation from said third to said second and first positions when said second coupling member is withdrawn from said passage; and unblocking means for unblocking said valve body in response to insertion of said second coupling member into said passage.

* * * * *